United States Patent
Kurin et al.

(10) Patent No.: US 10,789,667 B2
(45) Date of Patent: Sep. 29, 2020

(54) METHOD AND APPARATUS FOR DIGITAL WATERMARKING OF THREE DIMENSIONAL OBJECT

(71) Applicant: Treatstock Inc., Newark, DE (US)

(72) Inventors: Arsenii Kurin, Kazan (RU); Artem Arno, Kazan (RU)

(73) Assignee: TREATSTOCK INC., Newark, DE (US)

(*) Notice: Subject to any disclaimer, the term of this patent is extended or adjusted under 35 U.S.C. 154(b) by 54 days.

(21) Appl. No.: 16/009,574

(22) Filed: Jun. 15, 2018

(65) Prior Publication Data

US 2019/0385268 A1 Dec. 19, 2019
US 2020/0175641 A9 Jun. 4, 2020

Related U.S. Application Data

(60) Provisional application No. 62/520,506, filed on Jun. 15, 2017.

(51) Int. Cl.
| | |
|---|---|
| *G06K 9/00* | (2006.01) |
| *G06T 1/00* | (2006.01) |
| *G06T 17/20* | (2006.01) |
| *H04N 1/32* | (2006.01) |
| *H04L 9/06* | (2006.01) |
| *G06F 21/64* | (2013.01) |

(52) U.S. Cl.
CPC ............ *G06T 1/0064* (2013.01); *G06T 17/20* (2013.01); *H04N 1/3232* (2013.01); *H04N 1/32272* (2013.01); *H04N 1/32352* (2013.01); *G06F 21/64* (2013.01); *H04L 9/0618* (2013.01)

(58) Field of Classification Search
CPC ... G06T 1/0064; G06T 17/20; H04N 1/32272; H04N 1/32352; G06F 21/64; H04L 9/0618
USPC .......................................................... 382/100
See application file for complete search history.

(56) References Cited

U.S. PATENT DOCUMENTS

| | | | | |
|---|---|---|---|---|
| 5,134,690 A * | 7/1992 | Samatham | ........ | G06F 15/17343 710/317 |
| 6,956,568 B2 * | 10/2005 | Maekawa | ............. | G06T 1/0064 345/420 |
| 7,062,069 B2 * | 6/2006 | Rhoads | ................ | G06K 7/1417 382/100 |
| 7,130,443 B1 * | 10/2006 | Werner | ................ | H04N 19/467 382/100 |
| 7,158,654 B2 * | 1/2007 | Rhoads | ................ | G06K 7/1417 382/100 |
| 7,716,662 B2 * | 5/2010 | Seiden | ...................... | G06F 8/61 717/173 |
| 8,610,709 B2 * | 12/2013 | Choi | ..................... | G06T 1/0028 345/419 |

(Continued)

*Primary Examiner* — Marceau Milord
(74) *Attorney, Agent, or Firm* — Stamoulis & Weinbart LLC

(57) ABSTRACT

In one embodiment, a method for 3D digital watermarking for a triangular mesh using one or more key parameters is disclosed including forming a Hamiltonian path of a desired length around a selected vertex in a selected direction of a spiral; marking the selected vertex a dead end if there is a deadlock and continuing the spiral; and applying a watermark by introducing points in a path order on edges of the spiral, wherein information is encoded at a partition of adjacent triangles at one or more of the points.

16 Claims, 17 Drawing Sheets

(56) References Cited

U.S. PATENT DOCUMENTS

| | | | |
|---|---|---|---|
| 8,750,598 B2* | 6/2014 | Bonner | G06F 17/50 |
| | | | 382/154 |
| 9,710,705 B2* | 7/2017 | Doerr | G06K 9/0053 |
| 9,721,318 B2* | 8/2017 | Doerr | H04N 19/124 |
| 9,922,392 B2* | 3/2018 | Rolland-Neviere | ............ |
| | | | G06T 1/0092 |
| 10,438,311 B2* | 10/2019 | Lee | G06F 21/10 |
| 2002/0056041 A1* | 5/2002 | Moskowitz | G06Q 30/06 |
| | | | 713/176 |
| 2003/0187798 A1* | 10/2003 | McKinley | G06Q 40/04 |
| | | | 705/50 |
| 2003/0208679 A1* | 11/2003 | Lopez Vazquez | ............ |
| | | | H04N 1/32277 |
| | | | 713/176 |
| 2003/0219143 A1* | 11/2003 | Moskowitz | H04N 1/3232 |
| | | | 382/100 |
| 2007/0091856 A1* | 4/2007 | Raina | H04L 41/048 |
| | | | 370/338 |
| 2008/0019559 A1* | 1/2008 | Wang | H04N 1/32203 |
| | | | 382/100 |
| 2009/0319465 A1* | 12/2009 | Ignacio | G06N 5/02 |
| | | | 706/50 |
| 2010/0131571 A1* | 5/2010 | Reuveni | G06F 16/48 |
| | | | 707/803 |
| 2011/0286624 A1* | 11/2011 | Choi | G06T 15/00 |
| | | | 382/100 |
| 2012/0051584 A1* | 3/2012 | Bonner | G06T 1/0064 |
| | | | 382/100 |
| 2014/0055823 A1* | 2/2014 | Oishi | G06K 15/1892 |
| | | | 358/3.28 |
| 2015/0117650 A1* | 4/2015 | Jo | H04S 7/30 |
| | | | 381/17 |
| 2016/0117792 A1* | 4/2016 | Rolland-Neviere | ............ |
| | | | G06T 1/0064 |
| | | | 382/100 |
| 2017/0293647 A1* | 10/2017 | Sella | H04N 19/467 |
| 2018/0006757 A1* | 1/2018 | Prakash | H04B 10/27 |
| 2019/0066372 A1* | 2/2019 | Falk-Wallace | G06T 17/05 |

* cited by examiner

Figure 8. VALUE = X / (X + Y)

Figure 13. Generating length or finish mark

Figure 15. Finding path of required length on model

Figure 17. Reading watermark process

Figure 19. Build path from starting conditions and decode information from it

METHOD AND APPARATUS FOR DIGITAL WATERMARKING OF THREE DIMENSIONAL OBJECT

This application claims priority to U.S. Provisional Application No. 62/520,506 which is herein incorporated in its entirety herein.

BACKGROUND OF THE INVENTION

1. Field of the Invention

The present invention relates to three-dimensional (3D) object watermarking, and more particularly, relates to a method for watermarking a three-dimensional object using spiral path and key parameters and to a method for detecting such a watermark.

2. Background

Computer Aided Design (CAD) systems may be used to create three dimensional (3D) models of objects. Such models include faces, lines, and/or edges and the combination consisting of many interconnected parts. Such interconnections usually follow geometric principles.

Once rendered, the 3D modeled object may include a combination of points of a surface and the vectors that are normal to the surface. The points of the surface are usually provided as a set of 3D coordinates of the points on the object surface. A normal vector may be related to a point of the object surface.

Meshes are represented as a set of vertices, edges, and facets and collectively represent an approximation of the surface boundary of the 3D object. In this configuration, a triangle is formed and represents a triangular mesh.

Many popular file formats of models exit using the triangular mesh, including stereolithography (STL), polygon file format (PLY), object file format (OBJ). These formats are popular in design and 3D printing applications.

Due to the popularity of the 3D modeling, digital watermarking of multimedia has become prevalent to identify authors of such objects, protect the authenticity of the objects, and to provide other information. Digital watermarking includes modifying multimedia content to hide information that is only perceptible under certain conditions. Applications of digital watermarking may include copyright protection, authentication, and tracking of objects. The watermark may be a carrier signal with an embedded payload that contains the information of the watermark.

Watermarking methods may include those involving the triangle mesh representation. Watermarking in triangular mesh may include the following problems. For example, 3D models may be processed with different pieces of software and coded into different file formats. This may lead to a possible change in the internal order of the mesh storage but does not lead to a change in mesh geometry.

Models may be scaled without degrading quality, rotated at different angles for better visibility or printing, or translated to another formal position. However, these linear transformations of 3D models provide the illusion of a change of coordinates of points, but the model remains the same in form and design. In other challenges, the mark may be destroyed, or the model may be split and only a part of the original 3D model may be illegally used in another product. Additionally, in the case where a blind readable watermark with an open algorithm is used, infringement may be difficult to prove.

It is also important to ensure that a watermark may be detected by a decoder. Therefore, there is a need for a digital watermarking method and apparatus that may be used without deforming the shape of the 3D model, including when there are changes to the file format and/or mesh storage method. There is also a need for a watering marking method and apparatus that is robust to a linear transformation of a 3D model.

SUMMARY

In one aspect, a method for 3D digital watermarking for a triangular mesh using one or more key parameters is disclosed including forming a Hamiltonian path of a desired length around a selected vertex in a selected direction of a spiral; marking the selected vertex a dead end if there is a deadlock and continuing the spiral; and applying a watermark by introducing points in a path order on edges of the spiral, wherein information is encoded at a partition of adjacent triangles at one or more of the points.

The points may have a random offset from the edges. The watermark may include an initial marker based on the one or more key parameters. The watermark may be encrypted. The watermark may include a checksum. One or more labels may be applied to the mesh.

In another aspect, a method of blind reading of a digital watermark from a three-dimensional mesh using one or more key parameters includes searching for a location of a watermark by searching vertices or triangles of the mesh; recovering a Hamiltonian helical path having a length through one or more identified mesh triangles or vertices; determining a presence of an initial marker to determine the presence of a label at a given point to restore a first path length of the initial marker to determine the presence of the initial marker; building the path to a full path length; and extracting information from a location of points on the path. The method may include decoding the watermark content and a checksum verification.

In another aspect, a computer program product, stored on a non-transitory computer readable medium, comprising instructions that, when executed on one or more computers, cause the one or more computers to perform operations for a method for 3D digital watermarking for a triangular mesh using one or more key parameters is disclosed including forming a Hamiltonian path of a desired length around a selected vertex in a selected direction of a spiral; marking the selected vertex a dead end if there is a deadlock and continuing the spiral; and applying a watermark by introducing points in a path order on edges of the spiral, wherein information is encoded at a partition of adjacent triangles at one or more of the points.

In another aspect, a computer program product, stored on a non-transitory computer readable medium, comprising instructions that, when executed on one or more computers, cause the one or more computers to perform operations for a method of blind reading of a digital watermark from a three-dimensional mesh using one or more key parameters is disclosed including searching for a location of a watermark by searching vertices or triangles of the mesh; recovering a Hamiltonian helical path having a length through one or more identified mesh triangles or vertices; determining a presence of an initial marker to determine the presence of a label at a given point to restore a first path length of the initial marker to determine the presence of the initial marker;

building the path to a full path length; and extracting information from a location of points on the path.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
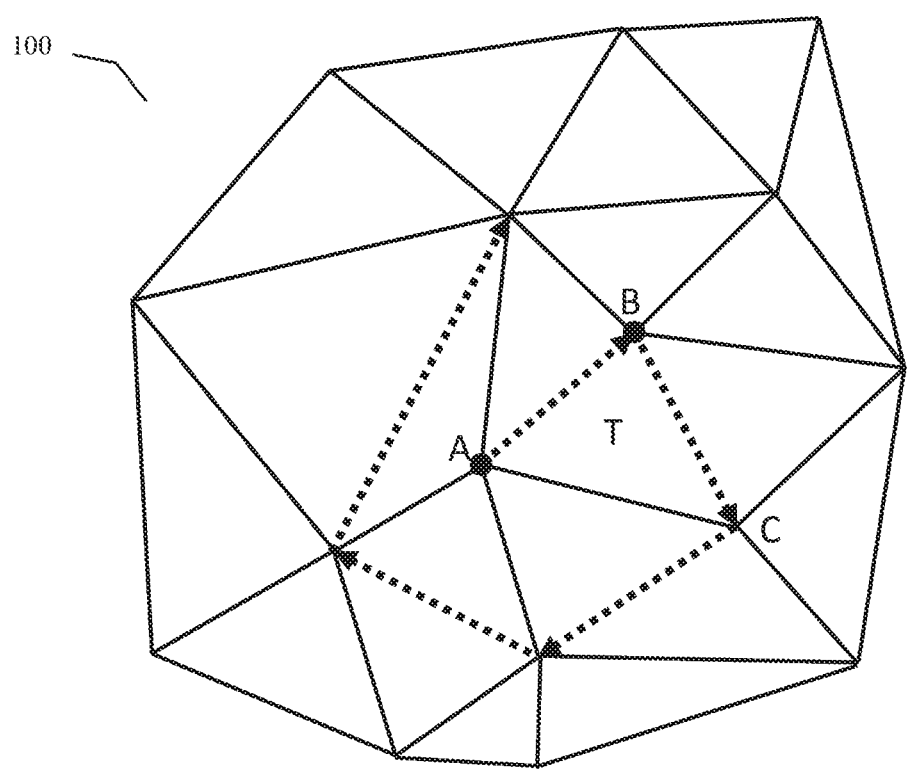
FIGS. 1-9 illustrate an example of a digital watermark application to a 3D triangular mesh network.

Each of the additional features and teachings disclosed below can be utilized separately or in conjunction with other features and teachings to provide a device, system, and/or method for a digital watermarking for a triangular mesh. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings Moreover, the various features of the representative examples and the dependent claims may be combined in ways that are not specifically and explicitly enumerated to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for original disclosure, as well as for the purpose of restricting the claimed subject matter.

Devices, methods, and systems are described for 3D digital watermarking for a triangular mesh. In one embodiment, spiral path and key parameters may be used. In one embodiment, watermark may be decoded and recovered. In one embodiment, a watermark may be created or constructed without substantially deforming the shape of a 3D model despite changes in file format or mesh storage method and be robust to a linear transformation of a 3D model. This means users may scale models without substantial or no degradation to the quality of the mesh, rotate the mesh to different angles over different axes, and/or translate the mesh to other formal positions.

In one embodiment, a small number of additional structures per watermark or the watermark itself may display the 3D model in a realistic manner. A structure is meant to refer to addition of vertices, edges and/or faces that may be used to change a mesh shape. The number of vertices, edges and/or faces may depend on a length of content placed into watermark, and/or an amount of watermark that is copied in different parts of a model. In one embodiment, a watermark may be read from a mesh area cut off from the object. In one embodiment, a public watermark may be constructed using no keys. In other embodiments, blind watermark reading may be used. Blind watermark reading may be defined as not knowing the shape of the original model. In one example, only the key or keys may be known for the model.

In one embodiment, a triangular mesh may include edges and triangles (facets). Any number of edges and triangles may be used to describe an object. In an embodiment, other facets may be possible, such as rectangles. In one embodiment, non-triangle facets may be converted to triangles before applying the methods and systems described herein.

In one embodiment, the mesh may not contain enough edges in a particular place. In one embodiment, a mesh may have design error, such as three facets refers to one edge or this edge have only one facet. In the case of such zones in the mesh, conventional zones may be used. A conventional zone is meant to refer to a zone of the correct mesh that have enough edges to hold a watermark.

In one embodiment, the number of vertices joined into the mesh may vary depending on the length of the content. In some embodiments, the number of additional vertices may vary depending on the length of content placed into a watermark. In one embodiment, the number of vertices in a connected area may be proportional to the length of the label. Additionally, the number of additional vertices, edges, and/or faces may be proportional to a length of a label. In one embodiment, a non-specific mesh on which Hamiltonian paths of required length can be built may be used. Other meshes may also be used.

A method in accordance with one embodiment may be as follows for applying a digital watermark to a 3D triangular mesh. It should be noted that not all steps may be required for a specific application. The steps may also be performed in any order.

A starting prefix may be selected. The prefix length may have any length. In one example, a prefix length of 32 bits may be used. If a key is used, a prefix from the key may be selected in any repeatable way. In one example, a 32-bit CRC checksum of key XOR with "ABCD" in ASCII characters codes may be used. In the case of no or empty key, any known sequence as a prefix, for example, "ABCD", may be used. A checksum can be added into the watermark content to increase the reliability of the determination of the watermark With a variable length watermark, a portion of the content may define the length of the label. In one embodiment, a symbol, such as "\O" may be added to and/or embedded as text to signify the end of the watermark content. In one embodiment, a watermark may be encrypted with a key. In one embodiment, the key may be from one or more initial parameters. Initial parameters may refer to information used to place the watermark. Such information may include a starting prefix, a method and key of encryption, and/or a method of encoding bytes into vertices. As such, using such parameters may enable placement of a watermark in any vertex and in any triangle of mesh in a right or left direction. In one embodiment, a blowfish algorithm may be used.

This prefix sequentially coupled with the encrypted watermark content with an end mark, such as the symbol "\0" described herein for embedding text information may be referred to as a "formed label."

To apply the formed label, any triangle (T) of mesh may be selected. Any vertex (A) in the triangle may be selected. The direction of the triangle traversal may be selected. The remaining vertices of triangle T may be selected as B and C. The number of potential starting conditions for the placement of watermark may be equal to the number of triangles in a mesh multiplied by the number of vertices in the triangle (=3) multiplied to number of directions of traversal (=2).

As shown in FIG. 1, a traversal of the mesh nodes starting from node A B C helically around point A may be performed by selecting one by one the mesh nodes. Previously selected nodes may not be selected. Observed edges may border with only two facets. When applying multiple watermarks on a model in one session, vertices from the construction of prior labels may not be used.

Figure 2:
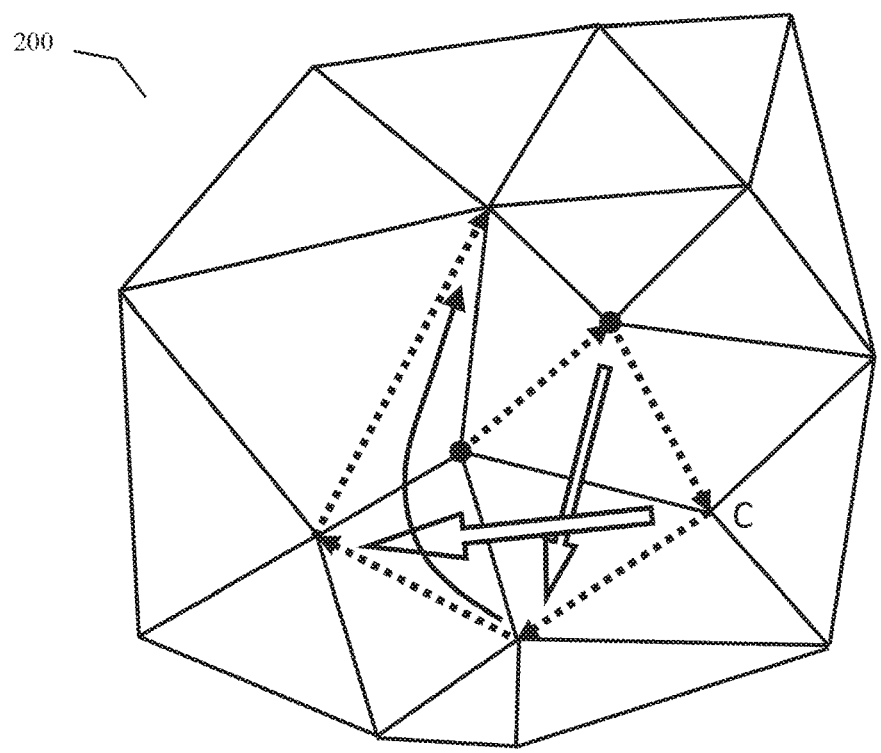
Figure 3:
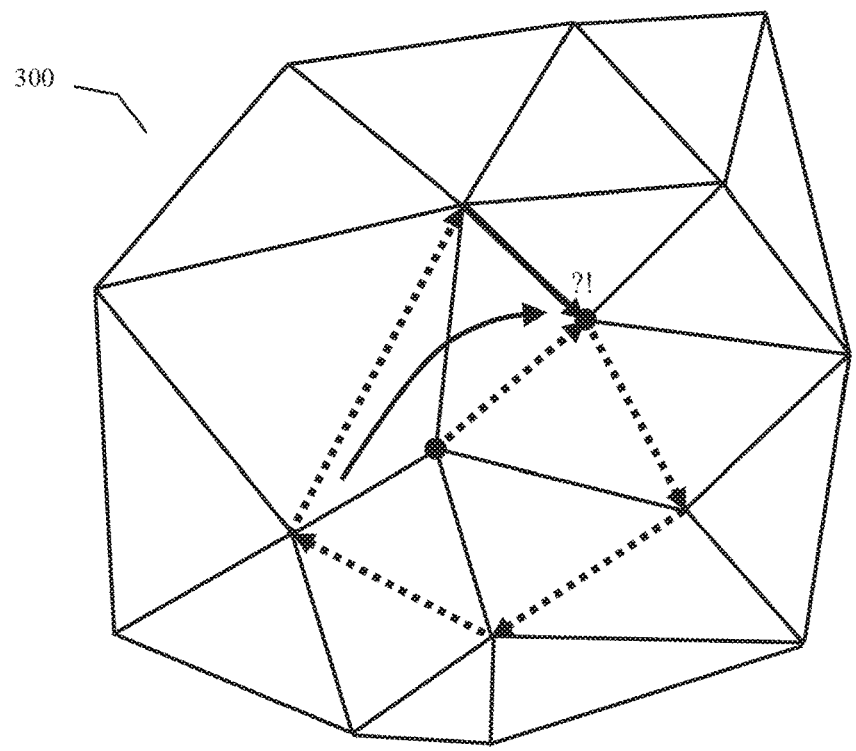
Figure 4:
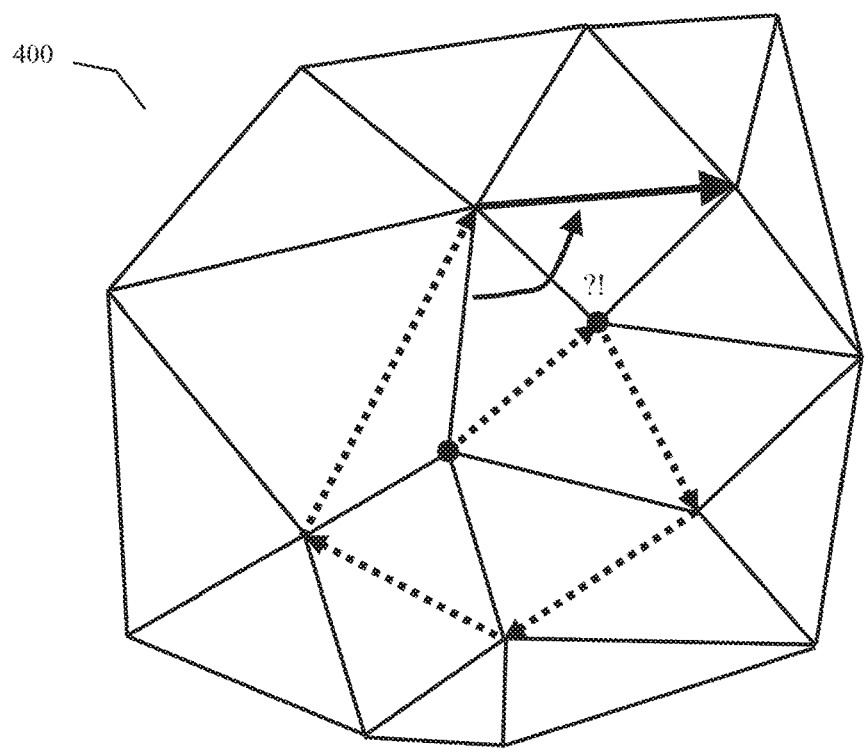
Figure 5:
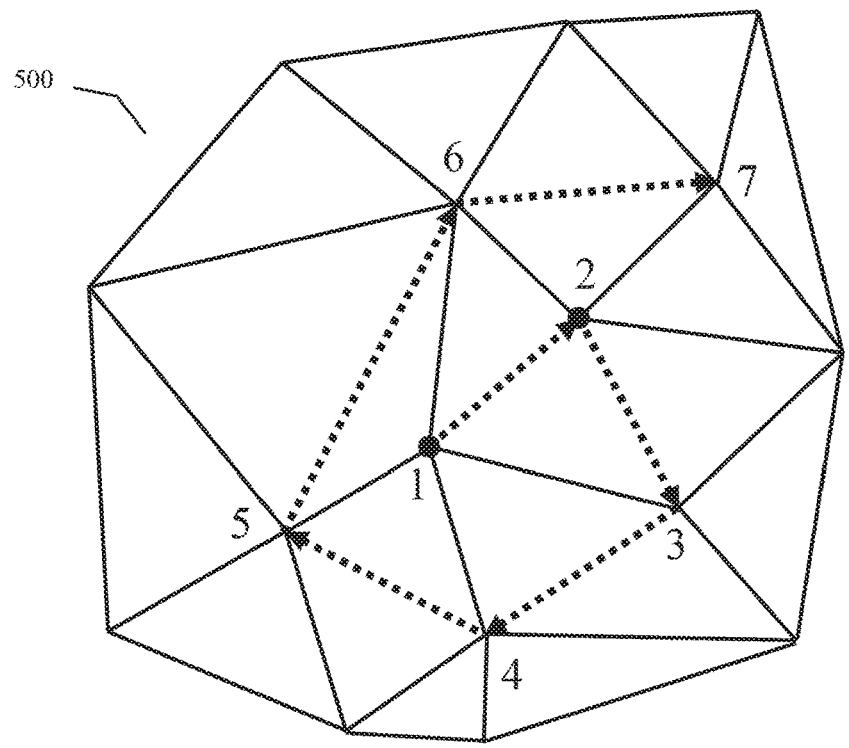
Figure 6:
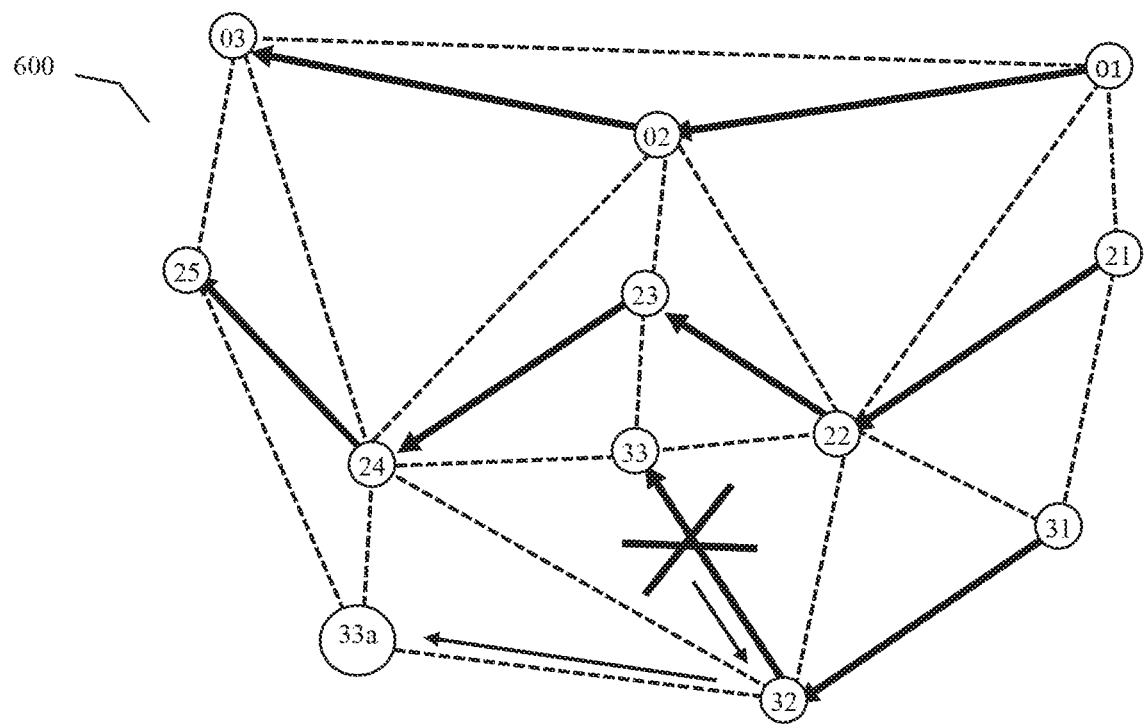

FIG. 2 shows choosing a next vertex by giving preference to the initial direction of traversal, which was set as nodes B and C using the edge and the opposite node in an embodiment. As shown in FIG. 3, if the selected node has resulted in the construction of a spiral, the selected node is marked as a dead end. This makes it necessary to select another node around the last selected vertex C. This node may be selected in the order of rotation around the last selected node in the direction opposite to the direction of constructing a spiral, as shown in FIG. 4. When the spiral cannot be constructed further, the last vertex may be marked as a dead end and a new vertex may be selected. For example, as shown in FIG. 6, vertex 33 may be marked as a dead end and then a new vertex may be selected by stepping back to vertex 32, and then choosing the next vertex in path such as 33A. Such a node is marked as a dead end. It is necessary to select another node around the last selected vertex C. This node may be selected in order of rotation around the last selected vertex in the direction opposite to the direction of constructing a spiral, as shown in FIG. 4. The above steps may be repeated in order to reach a required number of vertices in a path, as shown in FIG. 5. In one embodiment, in the construction of the path, in the case of getting a deadlock, it is possible to continue the construction of a spiral from the previous step with marking the latter vertex as a dead-end.

In some cases, given the mesh structure, it may be difficult to construct a spiral from a set of initial conditions. In one example, the initial triangle may belong to a separate small closed figure. In such a case, other initial conditions may be selected, such as the triangle starting point and direction of the traverse.

Figure 7:
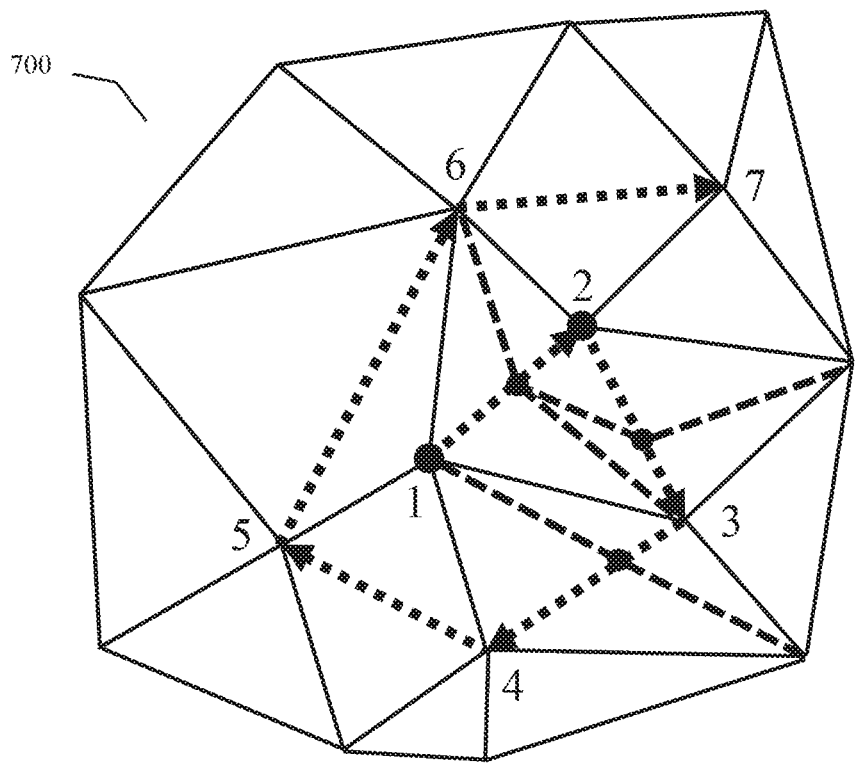

A watermark may be applied in an order of a sequence of the selected nodes of a path in one embodiment as follows. At each edge, add a new point, and split that point on two parts of each of the two triangles bordering that edge, as shown in FIG. 7. A portion of the information of the formed label may be encoded by selecting the point location on the broken edge, for example, at a location in which the edge is broken.

Figure 8:
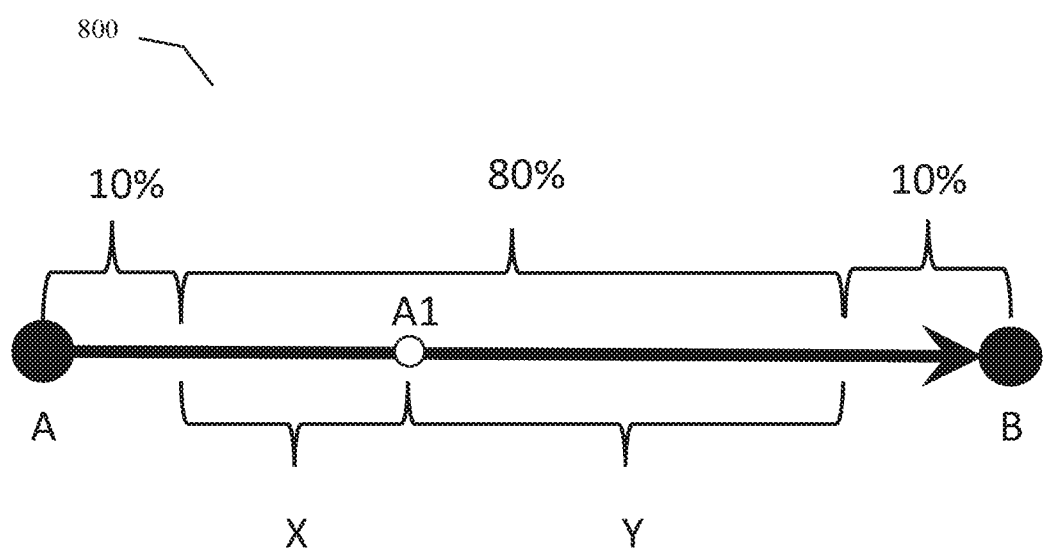

In order to create the appearance of a broken portion appearing to look as part of the mesh with no breakage, the breakable edge sections should be large enough, such that they are not considered processing errors by a mesh processing program. In one embodiment, the ratio may be 0.1 to 0.9, as shown in FIG. 8.

With one breakable edge, a quantity of information with a low bit-length recording of mantissa of used floating point numbers may be used. In one embodiment, to use the watermark for different storage formats of floating point numbers in different programs, and robustness to linear transformations and turns, the watermark may be encoded in a breaking edge with a smaller amount of data. In one example, a watermark may be encoded into one breakable edge with 8 bit data from a formed label by selecting a location point in proportion from 0.1 to 0.9 on the edge according to 8-bit number from the next character of formed label, as shown in FIG. 8. The length of the path maybe chosen to store the fully formed label into the path. In one example, every byte of a formed label may need one additional vertex to store it. Accordingly, when the length of the content embedded into watermark is known, the length of the spiral path may be calculated to store the label. In other examples, 4 bits of data or less may be encoded from formed label into one breaking edge. This makes the label more resistant to small changes of positions of vertices, such as to small random deformations of model, which can be used by attacker in order to destroy watermarks.

Small random variations may also be introduced in order to increase the security of the watermark. To accomplish this, it is possible to use the methods described in FIGS. 1-6 along with the introduction of small random variations in the direction of the breaking edge point. At the same time, partitions proportions should be kept exactly the same in order to preserve stored information. In this case, a watermark may cause little and controlled damage to the mesh. Additionally, the watermark cannot be detected and eliminated by the simple strict exclusion vertices located on the edges.

In one embodiment, new vertices may be selected or placed with a small displacement from existing edges. In this embodiment, the models may be slightly deformed, and significantly difficult to detect which edges contain the watermark, because most of the common vertices in the model have small displacements. Additionally, using a high quality 3D printer and high quality 3D scanner, these displacements may be detected and read, and thus, enabling of placing a digital watermark that is hidden but readable from a physical object. In one embodiment, contributed points can be rigorously partitionable on the edges, or have a small random offset so long as the encoding is not impacted to better conceal the watermarking.

The following detection method may include all or some of the steps below in any order necessary for an application. To detect, extract or decode the watermark and any associated content, the starting prefix may be detected. The known key may be used or a standard prefix. Then, all the triangles of the mesh are looped through, each going through all the vertices and the two traverse directions. A selected triangle T1 may include a vertex B and vertices from a traversal direction as B1 and A1, respectively. In one embodiment, the looping may occur for triangles in their reverse storage order. This may optimize computational costs.

Figure 9:
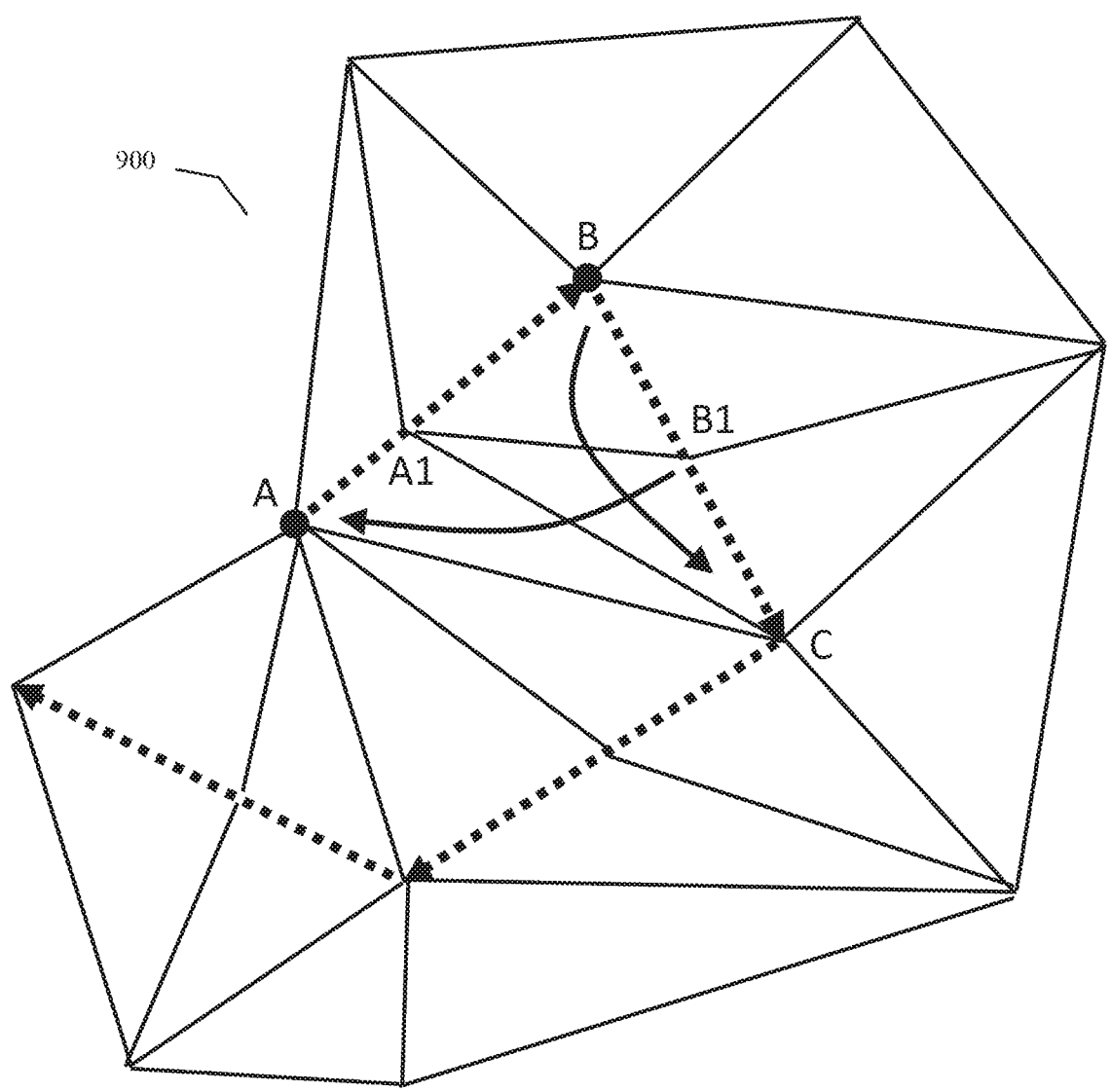

To restore a spiral path to the required length for storing a prefix, as shown in FIG. 9, the vertex (C) may be selected bordering with edge A1-B1 but not B. A vertex A may be selected bordering with edge A1-C, but not B1. The spiral may be reconstructed, as described above, constructed by beginning of a spiral as A-A1-B-B1-C-. Once the spiral is complete, the watermark may be searched. A number of spiral path vertices needed to store the prefix may be received. In one embodiment, extract from that path the prefix content by calculating the ratio of the lengths of the edges. This means that the pair of odd and even edges once had one edge broken, as shown in FIG. 8. If the prefix does not match, the search may continue. If the prefix matches, one or more spiral paths with the same initial conditions may be constructed.

In one embodiment, the method may include extracting from the spiral path the content of formed label similar, excluding the prefix, from formed path and decrypt reminder using the key. Alternatively, if the decrypted content of the watermark detects a marker, and if (when using a checksum) checksum is correct, the extraction of watermark content ceases, and the watermarked information is perceptible.

Figure 10:
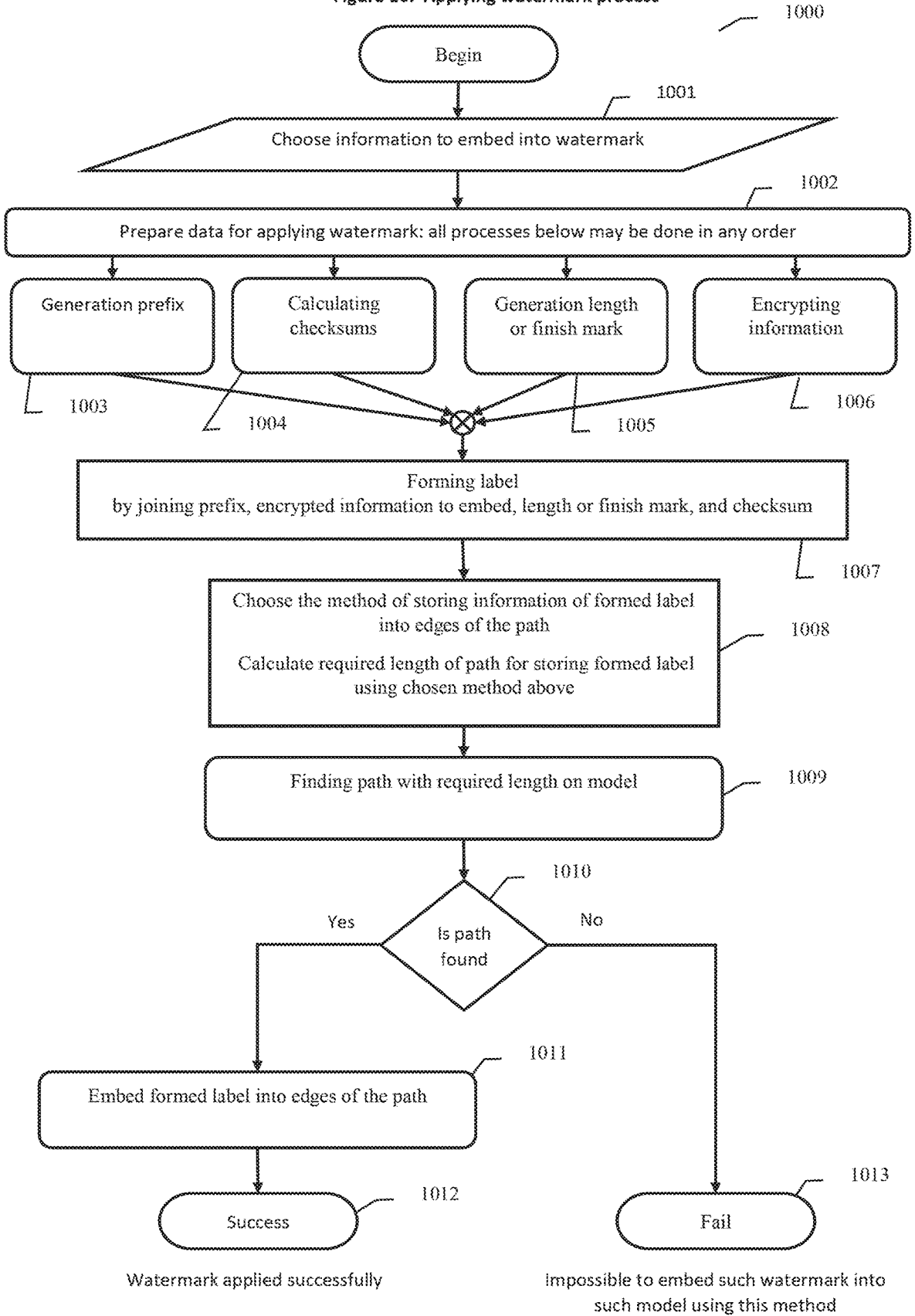
FIG. 10 shows a flow chart for applying a watermark in an embodiment.

FIG. 10 shows a process for applying a watermark in an embodiment. Information to embed into the watermark may be chosen at 1001. The data may then be prepared at 1002 by generating a prefix at 1003, calculating checksums at 1004, generating length or finish mark at 1005, or encrypting information at 1006. Any of the processes 1002-1006 may be performed in any order. The label may then be formed at 1007. At 1008, a method of storing information of the formed label into the edges of the path and calculating the required length of the path for storing the formed label from the selected method are performed. At 1009, the path is found. If the path is found at 1010, embed the formed label into the edges of the path at 1011-1012. If no path is found, there is a fail at 1013.

Figure 11:
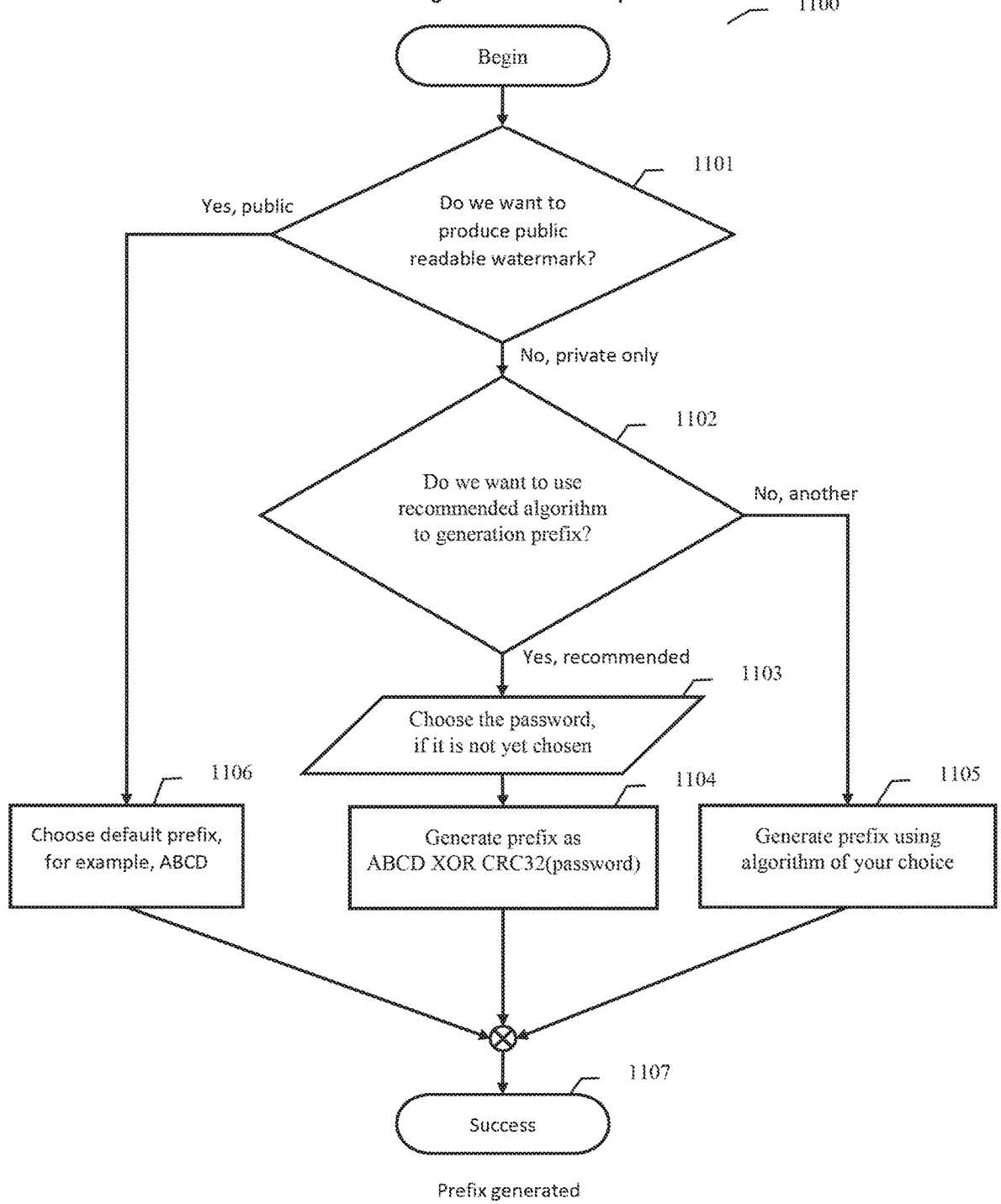
FIG. 11 shows a flow chart for generating a prefix in an embodiment.

FIG. 11 shows a flow chart for generating a prefix 1100. If a public readable watermark is desired, a default may be used (1101, 1106, and 1107). If a private watermark is desired at 1101 and a recommended algorithm is used to generate a prefix at 1102, a password is selected at 1103 and a prefix is generated at 1104 and the process completes at 1107. If a preferred algorithm that is not recommended is chosen, then a prefix is generated at 1105, and the process completes at 1107.

Figure 12:
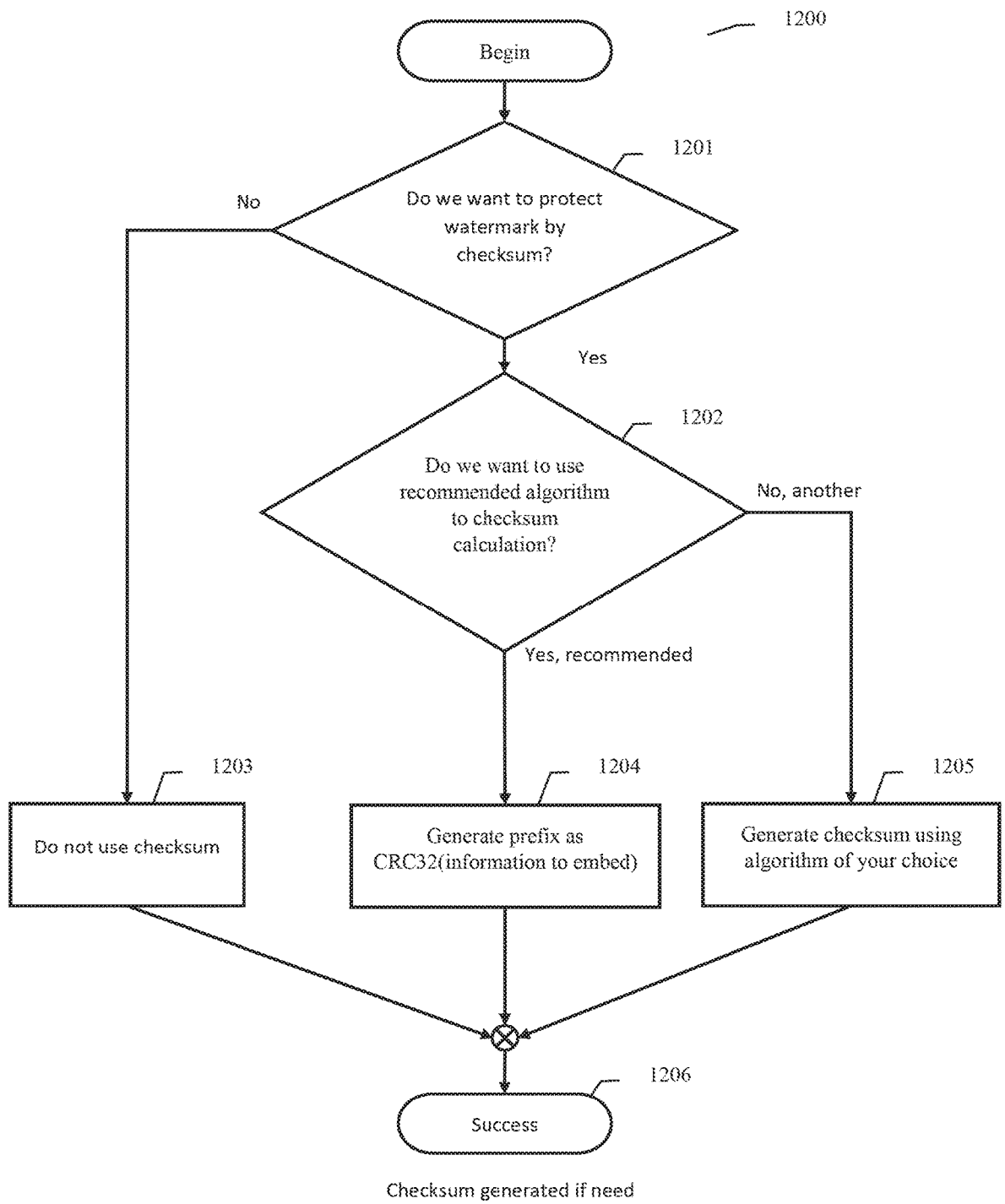
FIG. 12 shows a flow chart for calculating a checksum in an embodiment.

FIG. 12 shows a flow for calculating a checksum 1200. At 1201, it is determined whether the watermark should be protected by a checksum. If at 1201 the answer is no, the process proceeds to do not use a checksum at 1203 and ends at 1206. If a checksum is required, then at 1202, it is determined whether to use a recommended algorithm, generate a prefix at 1204, and complete the process of 1206. If a preferred checksum is to be used, then a check checksum is generated at 1205 and the process is completed 1206.

Figure 13:
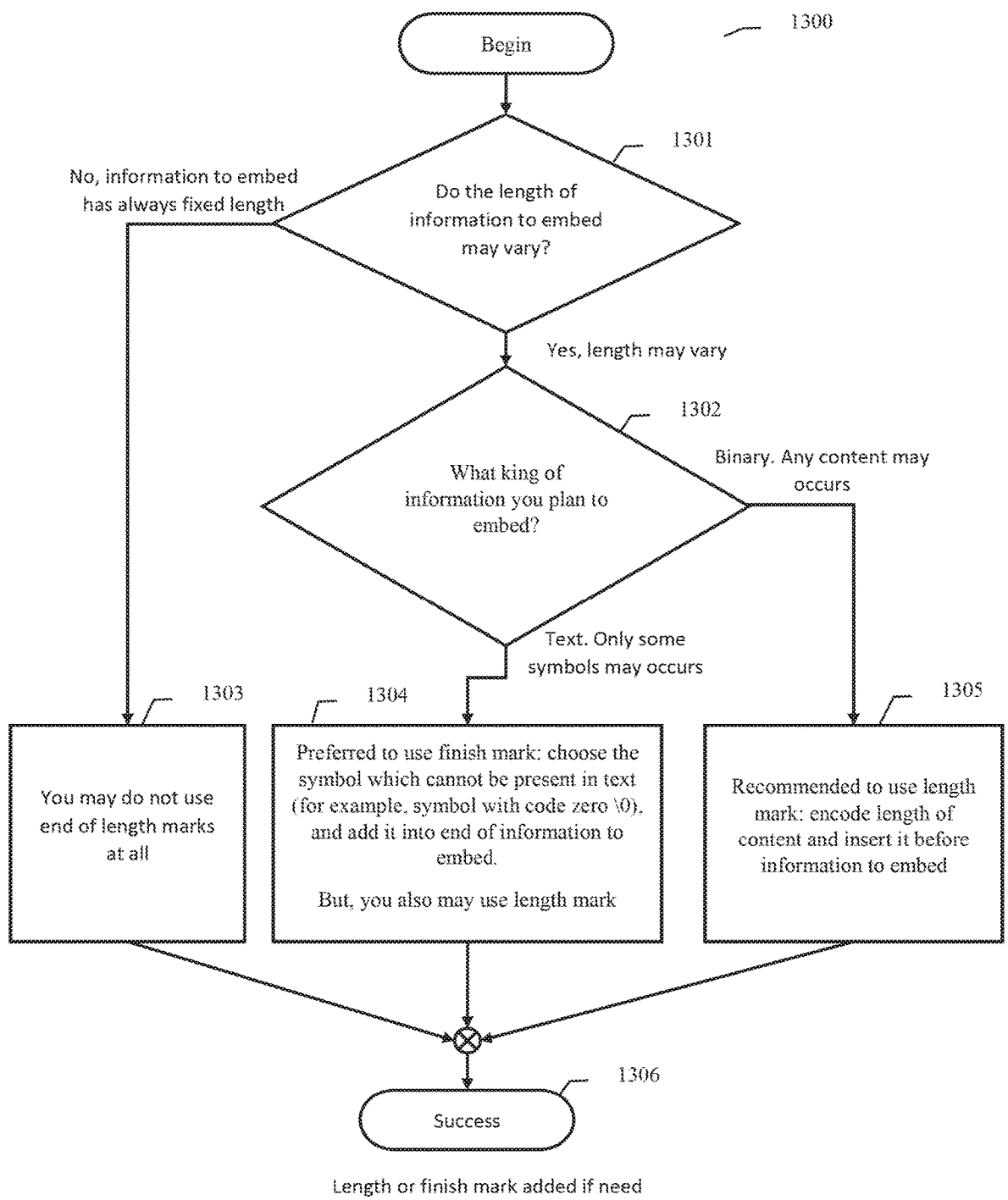
FIG. 13 shows a flow chart for generating length or finish marks in an embodiment.

FIG. 13 shows a flow for generating length or finish work. At 1301 it is determined if the length of information to embed is variable. If the length is fixed, no end of length marks is used at 1303. At 1302, determine what type of information is going to be embedded. If it is text, then the process goes to 1304 and preferably uses a finish work. A length mark may also used. At 1302 if the information to embed is binary, it is recommended to use a length mark at 1305. The process ends at 1306.

Figure 14:
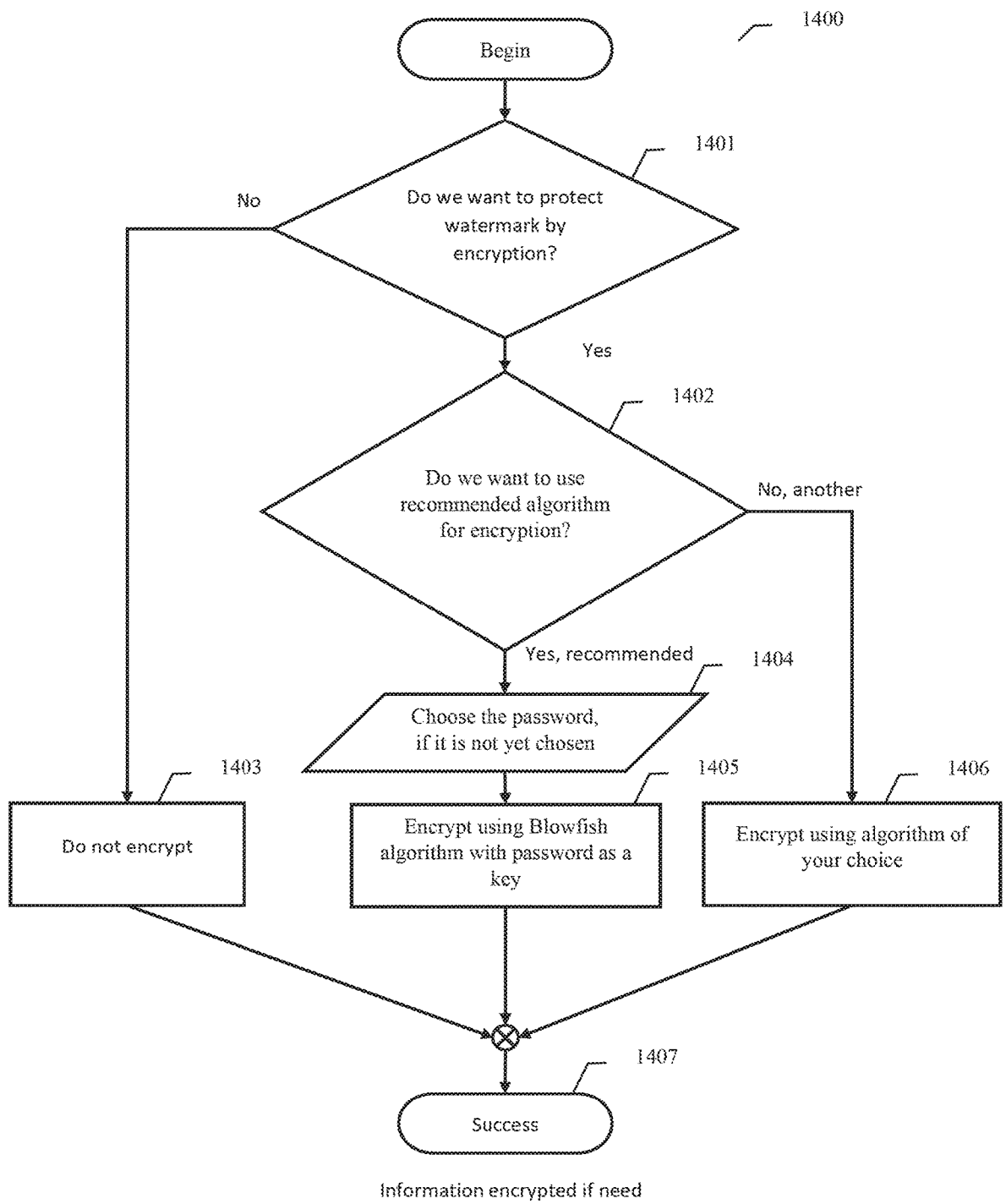
FIG. 14 shows a flow chart for encrypting information in an embodiment.

FIG. 14 shows the flow for encrypting information. At 1401, it is determined whether the watermark should be protected by encryption. If not, the mark is not encrypted at 1403. If the mark is to be encrypted and the recommended algorithm for encryption is to be used at 1402, the password is selected if it does not already exist at 1404 and encryption performed at 1405. Encryption may also be performed using a preferred algorithm, as shown at step 1406. The process ends at 1407.

Figure 15:
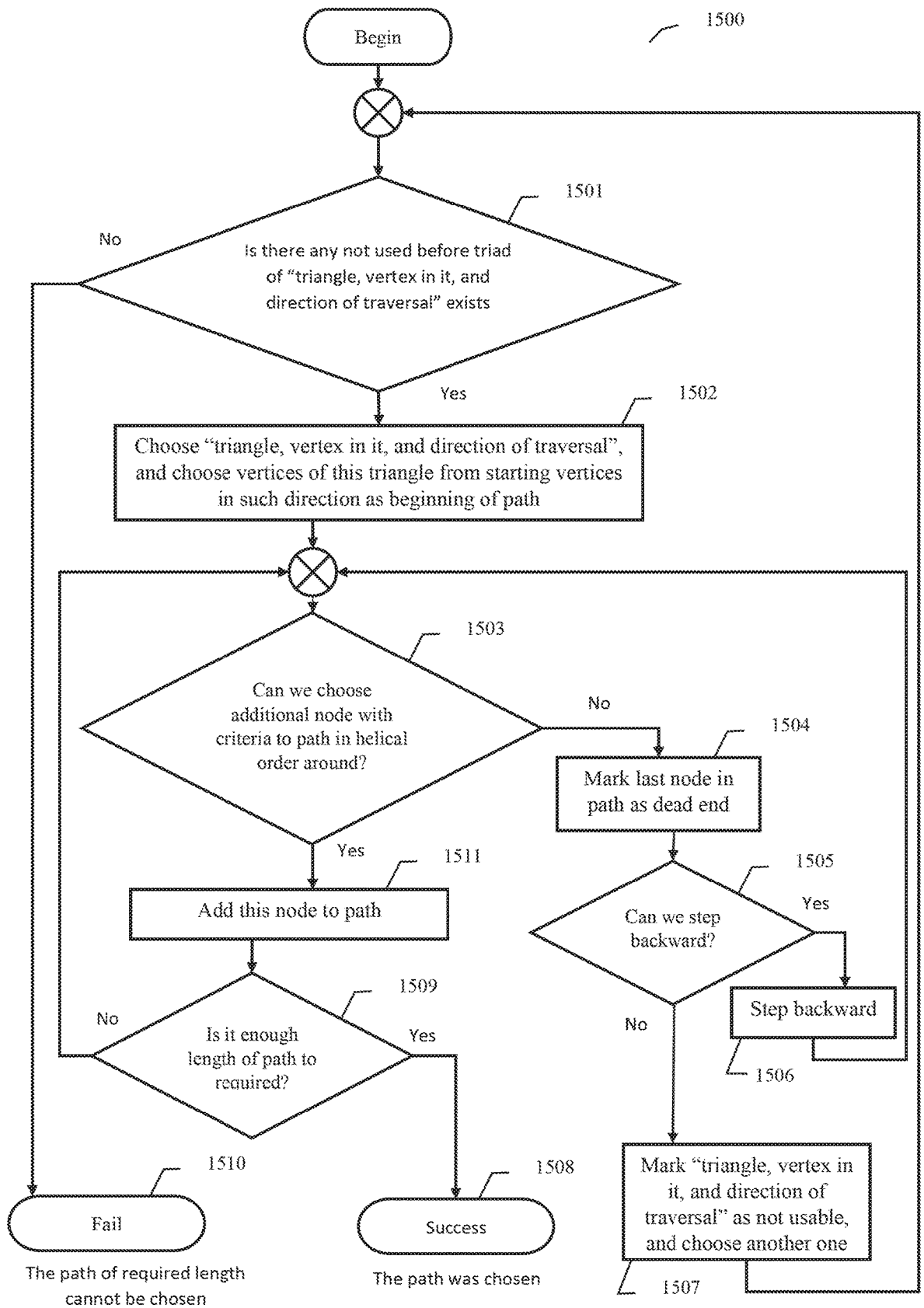
FIG. 15 shows a flow chart for finding a path of required length of a model in an embodiment.

FIG. 15 shows a flow of finding a path of a required length 1500. The vertices the direction of the triangle traversal may be selected at 1501, 1502. If none are available, the process fails at 1510. At 1503, it is determined if another node may be selected and may be added to the path at 1511. If the length of the path is sufficient at 1509, the process ends at 1508. If the length is not sufficient, then the process returns to 1503.

If no node is available at 1503, the last node in the path may be marked as dead at 1504 and it is determined if a step backward may be made at 1505. If yes at 1506, the process proceeds back to 1501. If no, another triangle is chosen at 1507 and the process returns to 1501.

Figure 16:
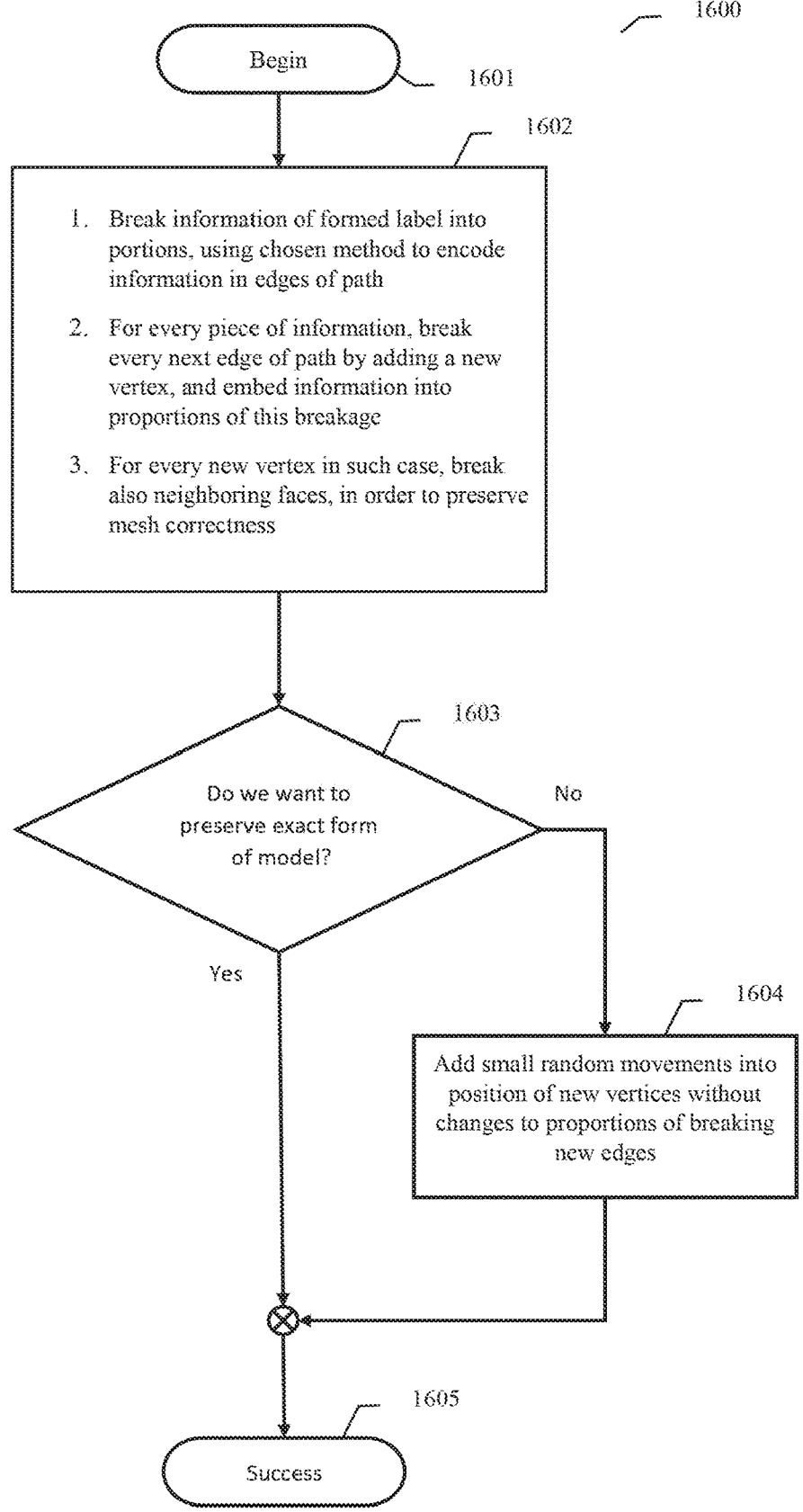
FIG. 16 shows a flow chart for embedding a formed label into the edges of a path in an embodiment.

FIG. 16 shows a flow for embedding a formed label into edges of a path 1600. At 1601, 1602, the formed label is broken into portions, using the method chosen to encode information in the edges of path. For every piece of information, break every next edge of path by adding a new vertex, and embed information into proportions of this breakage. Additionally, for every new vertex in such case, break also neighboring faces, in order to preserve mesh correctness. At 1603, it is determined if the exact form of the model wants to be preserved. If yes, proceed to 1605. If no, add small random movements into position of new vertices without changes to proportions of breaking new edges at 1604, and then proceed to 1605.

Figure 17:
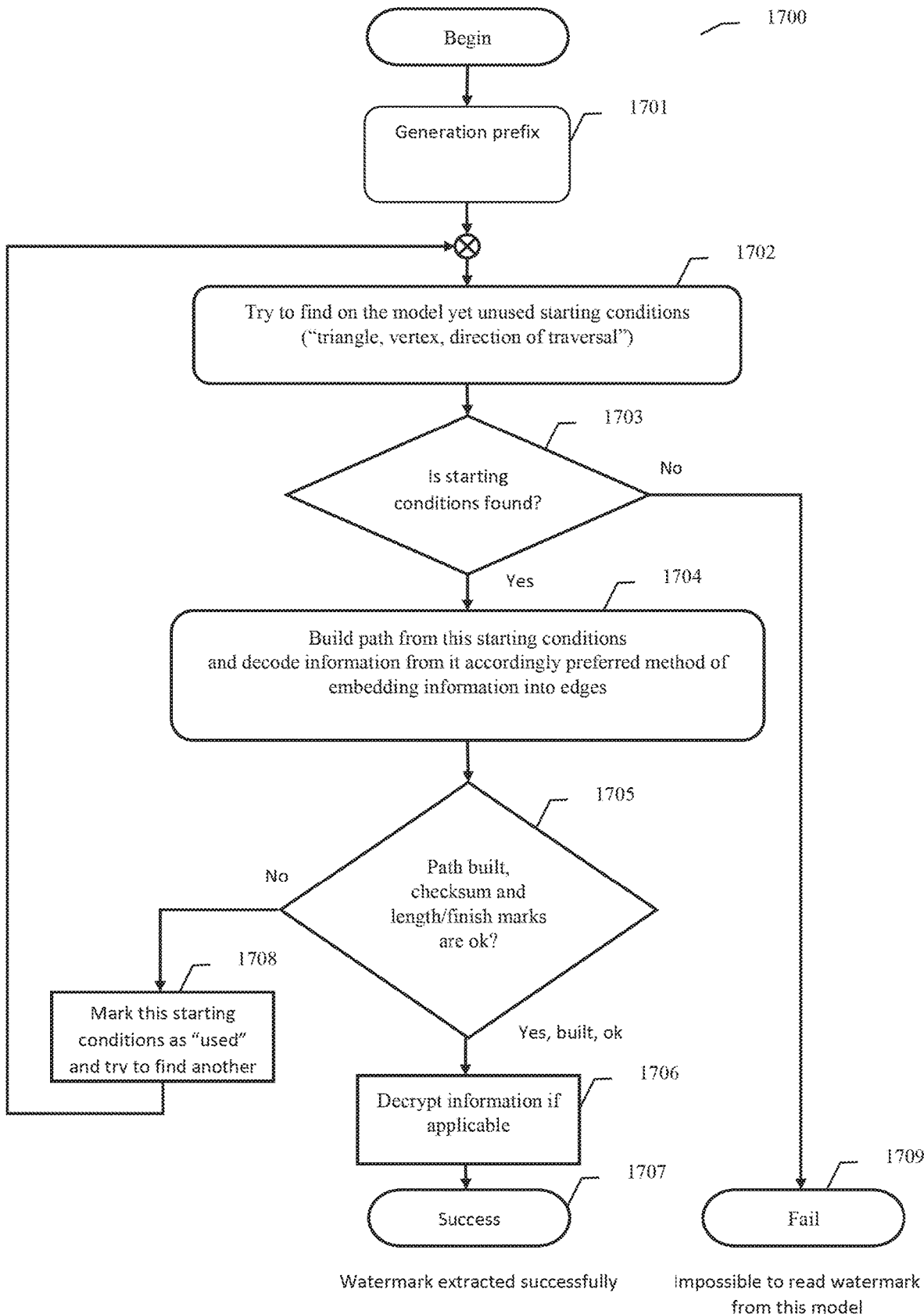
FIG. 17 shows a flow chart for reading a watermark in an embodiment.

FIG. 17 shows a reading watermark process 1700. At 1701, generate a prefix. At 1702, try to find a model with used starting conditions. If the starting conditions are found, then build a path from the starting condition and decode the information using the methods used to embed information into the edges. At 1705, it is determined if the path built, checksum and length/finish are acceptable. If not, these conditions are marked as used and at 1708 and the process return back to 1702. If yes, information is decrypted if applicable at 1706 and the process completes at 1707. If the starting conditions are not found, it is determined that the watermark cannot be read from this model at 1709.

Figure 18:
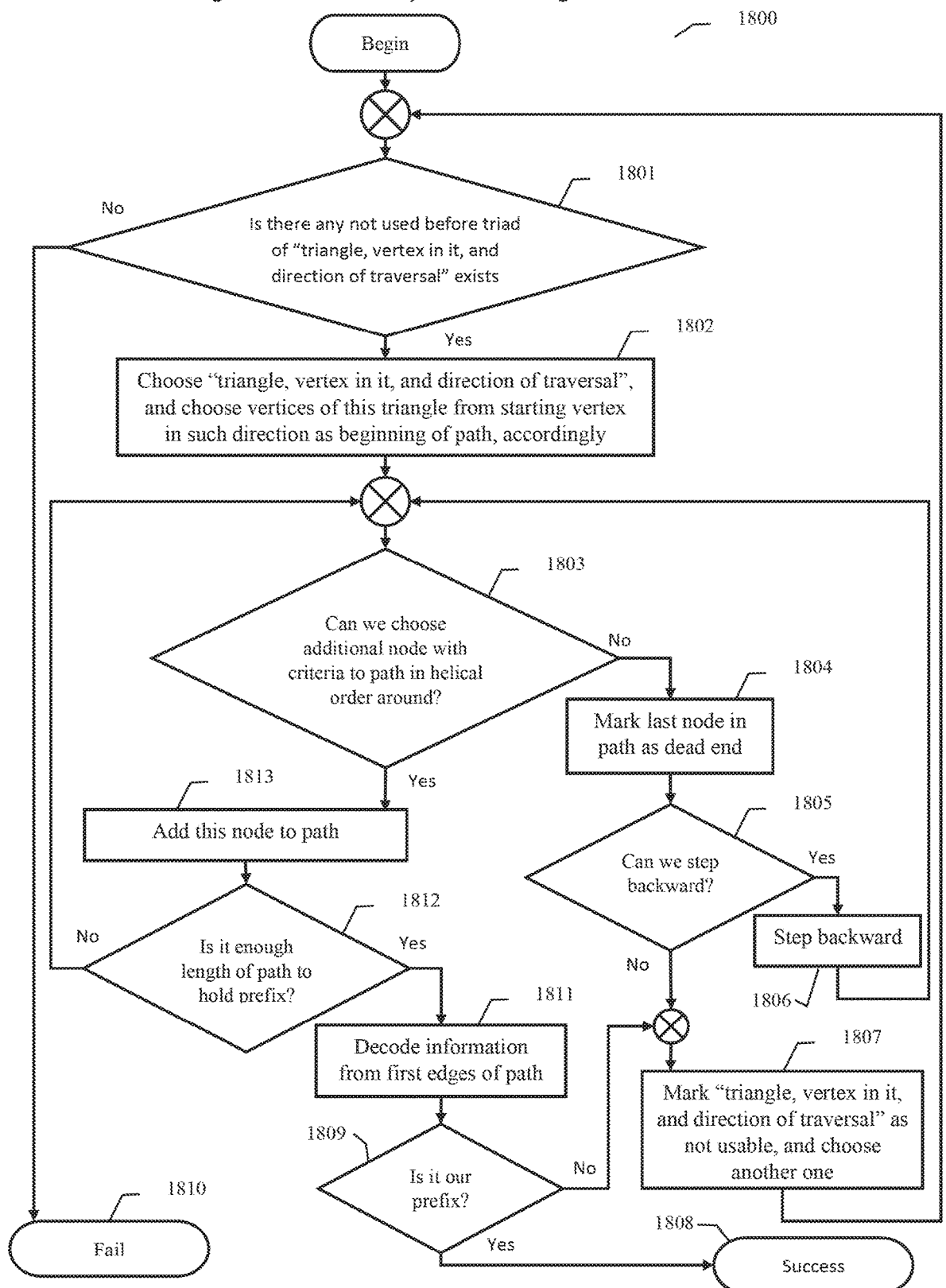
FIG. 18 shows a flow chart to find a model yet unused starting conditions. in an embodiment.

FIG. 18 shows a flow for finding a model with unused starting conditions. The vertices and the direction of the triangle traversal may be selected at 1801, 1802. If none are available, the process fails at 1810. At 1803, it is determined if another node may be selected and may be added to the path at 1813. If the length of the path is sufficient at 1812, the information is decoded from the first edges of the path at 1811. If it is the prefix being searched at 1811, the process ends at 1809. If the length is not sufficient, then the process returns to 1803. If no node is available at 1803, the last node in the path may be marked as dead at 1804 and it is determined if a step backward may be made at 1805. If yes (1806), the process proceeds back to 1501. If no, another triangle is chosen at 1807 and the process returns to 1801.

Figure 19:
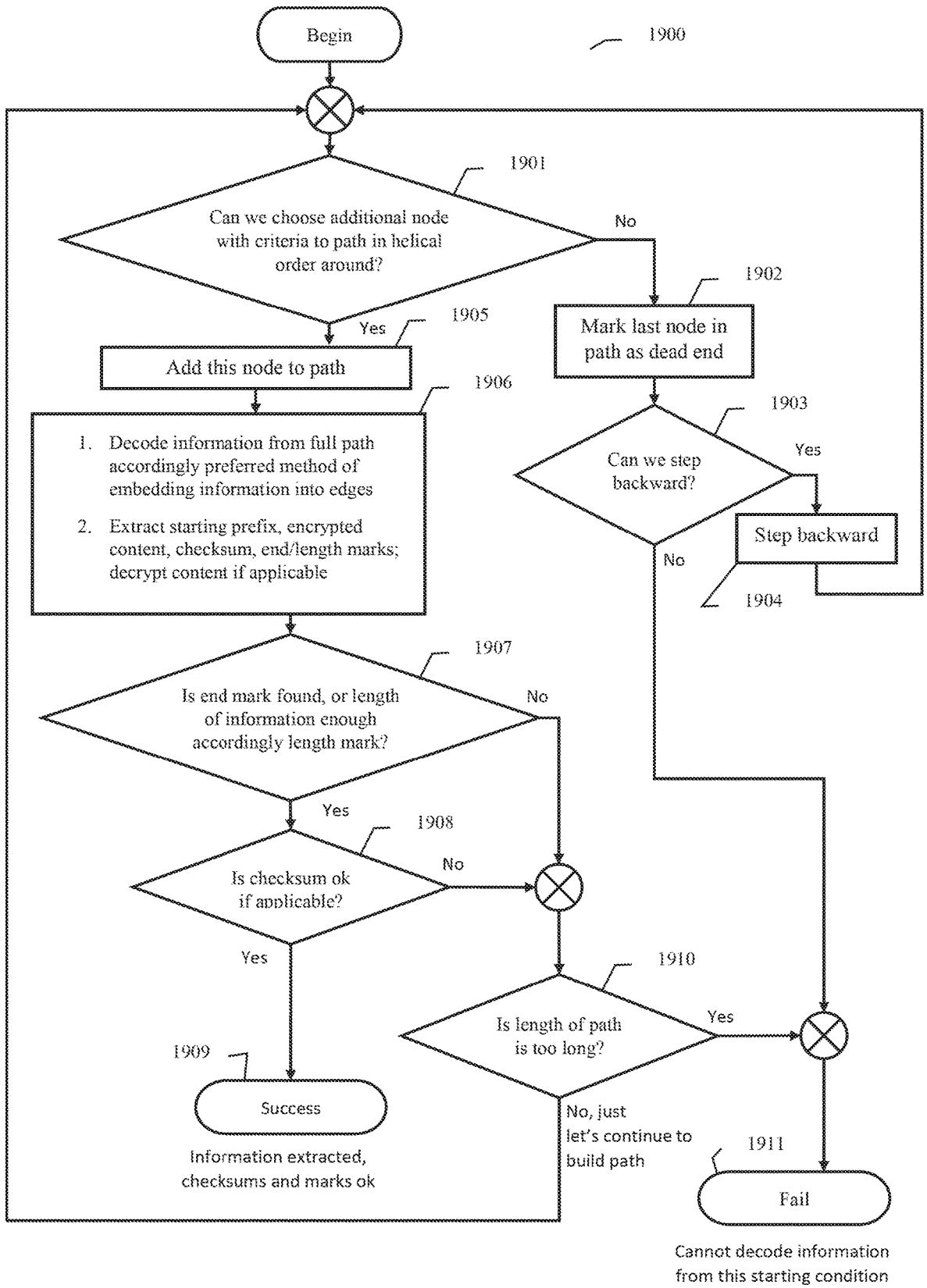
FIG. 19 shows a flow chart to build a path from starting conditions and decoding information.

FIG. 19 shows a flow to build a path from starting conditions and decode information from those conditions 1900. At 1901, it is determined whether to choose an additional node with criteria for a path in a helical order. If the answer is yes, add this node to the path of 1905. At 1906, information from full path is decoded using the method initially used to embed information into edges. The starting prefix, encrypted content, checksum, end/length marks, and decrypt content are extracted, if applicable.

At 1907 it is determined whether the end mark is found, or length of information is enough according to the length mark. If yes, at 1908, it is determined if the checksum is OK. If yes, proceed to 1909, and the information is extracted. If no at 1907, or no at 1908, at 1910, it is determined if the length of the path is too long. If yes, the information cannot be decoded from the starting conditions at 1911. If no, the path continues to build it is returned back to 1901. If at 1901, the answer is no, the node is marked as a dead end at 1902, and it is determining if a step backward can be performed at 1903. If no, proceed to 1911. If yes at 1904, proceed back to 1901.

Figure 20:
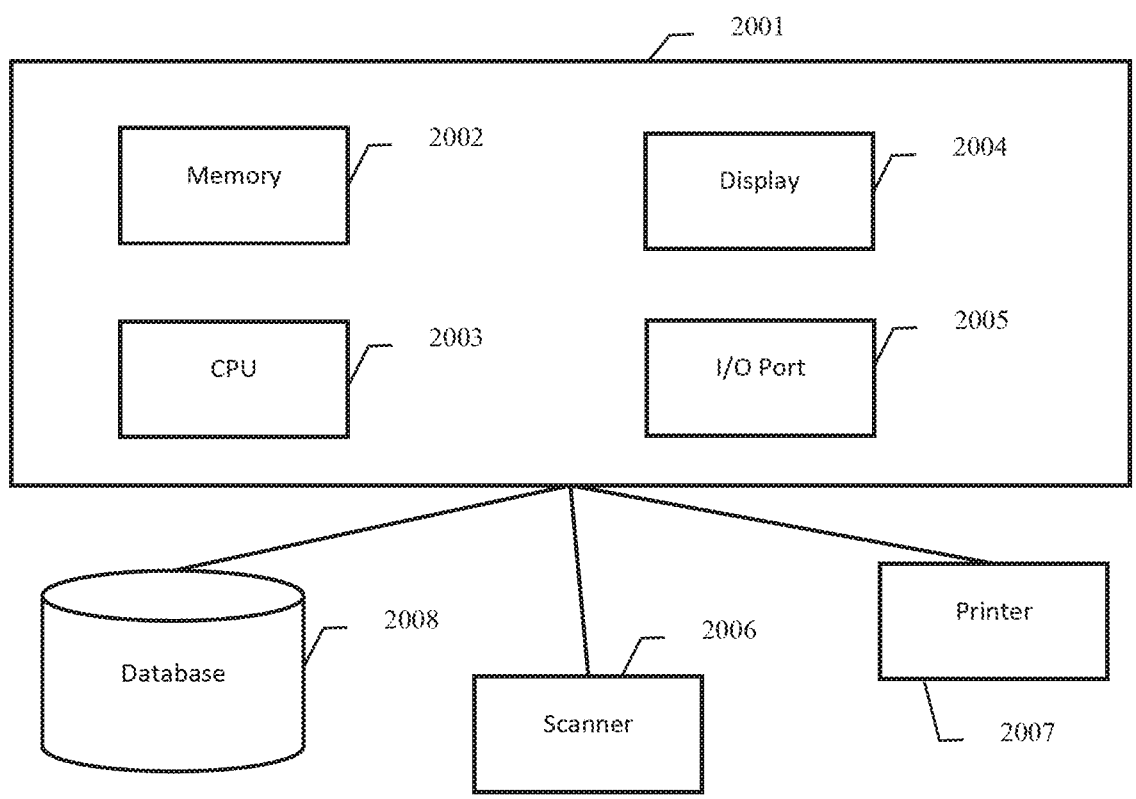
FIG. 20 shows a system that may execute software or executable code for performing the methods and steps of the inventions described herein

In some embodiments, when applying multiple labels on a mesh, their constructed path may not overlap at any node. Additionally, more than one label may be applied to the mesh FIG. 20 shows a system for performing the methods and steps described herein for watermarking. The system may include or more of the components shown in FIG. 20 and one or more of the components may be connected by wires, wirelessly, or a combination of both. The system may include a computing device 2001 that includes a memory 2002, CPU 2003, I/O Ports 2005, and a display 2004. The device 2001 may be a mobile device, laptop, desktop, tablet, or any other computing device. The device 2001 may be communicatively coupled to a database 2008, a scanner 2007, and/or a printer 2006. The system may also operate over a cloud computing environment and the elements 2006-2008 may be accessed over the cloud. The software for executing the steps and methods shown in one or more of the FIGS. 1-19 may be executed by CPU 2003.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A method for 3D digital watermarking for a triangular mesh using one or more key parameters; comprising:
    forming a Hamiltonian path of a desired length around a selected vertex in a selected direction of a spiral;
    marking the selected vertex a dead end if there is a deadlock and continuing the spiral; and
    applying a watermark by introducing points in a path order on edges of the spiral, wherein information is encoded at a partition of adjacent triangles at one or more of the points.

2. The method of claim 1 wherein the points have a random offset from the edges.

3. The method of claim 1 wherein the watermark includes an initial marker based on the one or more key parameters.

4. The method of claim 1 wherein the watermark is encrypted.

5. The method of claim 1 wherein the watermark includes a checksum.

6. The method of claim 1 wherein one or more labels are applied to the mesh.

7. A method of blind reading of a digital watermark from a three-dimensional mesh using one or more key parameters, comprising:
    searching for a location of a watermark by searching vertices or triangles of the mesh;
    recovering a Hamiltonian helical path having a length through one or more identified mesh triangles or vertices;
    determining a presence of an initial marker to determine the presence of a label at a given point to restore a first path length of the initial marker to determine the presence of the initial marker;
    building the path to a full path length; and
    extracting information from a location of points on the path.

8. The method of claim 7 further comprising decoding the watermark content and a checksum verification.

9. A computer program product, stored on a non-transitory computer readable medium, comprising instructions that, when executed on one or more computers, cause the one or more computers to perform operations for a method for 3D digital watermarking for a triangular mesh using one or more key parameters,
    forming a Hamiltonian path of a desired length around a selected vertex in a selected direction of a spiral;
    marking the selected vertex a dead end if there is a deadlock and continuing the spiral; and applying a watermark by introducing points in a path order on edges of the spiral, wherein information is encoded at a partition of adjacent triangles at one or more of the points.

10. The computer program product of claim 9 wherein the points have a random offset from the edges.

11. The computer program product of claim 9 wherein the watermark includes an initial marker based on the one or more key parameters.

12. The computer program product of claim 9 wherein the watermark is encrypted.

13. The computer program product of claim 9 wherein the watermark includes a checksum.

14. The computer program product of claim 9 wherein one or more labels are applied to the mesh.

15. A computer program product, stored on a non-transitory computer readable medium, comprising instructions that, when executed on one or more computers, cause the one or more computers to perform operations for a method of blind reading of a digital watermark from a three-dimensional mesh using one or more key parameters, comprising:

searching for a location of a watermark by searching vertices or triangles of the mesh;

recovering a Hamiltonian helical path having a length through one or more identified mesh triangles or vertices;

determining a presence of an initial marker to determine the presence of a label at a given point to restore a first path length of the initial marker to determine the presence of the initial marker;

building the path to a full path length; and extracting information from a location of points on the path.

16. The computer program product of claim 15 further comprising decoding the watermark content and a checksum verification.

\* \* \* \* \*